United States Patent
Koshima et al.

(10) Patent No.: US 6,415,155 B1
(45) Date of Patent: *Jul. 2, 2002

(54) LOCATION SYSTEM AND METHOD FOR IDENTIFYING POSITION OF MOBILE TERMINAL THAT CAN COMMUNICATE BASED ON REPEATER IN RADIO ZONE, AND MOBILE TERMINAL THAT CAN COMMUNICATE BASED ON REPEATER IN RADIO ZONE

(75) Inventors: Hiroaki Koshima; Kimio Muya; Katsuhiko Kumamoto, all of Osaka (JP)

(73) Assignee: Locus Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/225,544

(22) Filed: Jan. 5, 1999

(30) Foreign Application Priority Data

Jan. 14, 1998 (JP) .............................................. 10-005547

(51) Int. Cl.[7] ................................................ H04Q 7/20
(52) U.S. Cl. ...................................... 455/456; 342/450
(58) Field of Search ............................... 455/456, 457, 455/7; 342/450, 463, 464; 701/200, 300

(56) References Cited

U.S. PATENT DOCUMENTS

| | | | | |
|---|---|---|---|---|
| 5,513,243 A | * | 4/1996 | Kage | 455/456 |
| 5,613,205 A | * | 3/1997 | Dufour | 455/33.2 |
| 5,724,660 A | * | 3/1998 | Kauser et al. | 455/456 |
| 5,850,609 A | * | 12/1998 | Sugarbroad et al. | 455/456 |
| 5,999,126 A | * | 12/1999 | Ito | 455/456 |
| 6,055,434 A | * | 4/2000 | Seraj | 455/456 |
| 6,140,964 A | * | 10/2000 | Sugiura et al. | 342/464 |

FOREIGN PATENT DOCUMENTS

| | | | |
|---|---|---|---|
| EP | 0814627 A2 | * | 12/1997 |
| GB | 2304250 A | * | 3/1997 |
| JP | 06-213991 | | 8/1994 |
| JP | 09-171070 | | 6/1997 |
| WO | WO97/33386 | * | 9/1997 |

* cited by examiner

Primary Examiner—Nguyen T. Vo
(74) Attorney, Agent, or Firm—McDermott, Will & Emery (57) ABSTRACT

A plurality of ID transmitters that can issue an ID are provided in a building. A center station registers position information that allows identification of the position of an ID transmitter for every different ID. A PHS mobile terminal measures the received field intensity of each repeater and each ID transmitter. The measured result is sent to the center station. The center station identifies the position of the mobile terminal according to the measured result and the position information. Accordingly, the accuracy of the location of a mobile terminal can be improved without increasing the number of repeaters.

6 Claims, 7 Drawing Sheets

LOCATION SYSTEM AND METHOD FOR IDENTIFYING POSITION OF MOBILE TERMINAL THAT CAN COMMUNICATE BASED ON REPEATER IN RADIO ZONE, AND MOBILE TERMINAL THAT CAN COMMUNICATE BASED ON REPEATER IN RADIO ZONE

BACKGROUND OF THE INVENTION

1. Field of the Invention

The present invention relates to a location system, a location method, and a mobile terminal. More particularly, the present invention relates to a location system and a location method to identify the position of a mobile terminal that can communicate based on a repeater installed in a radio zone, and such a mobile terminal.

2. Description of the Background Art

As an example of a zone communication system that allows communication based on repeaters provided in a plurality of radio zones respectively, a small zone radio communication system such as a PHS (Personal Handyphone System) is known.

The PHS portable terminal representative of a mobile terminal in a small zone radio communication system is used as a cordless telephone at home. It can also be carried outside to be connected to public and digital networks via indoor or outdoor public repeaters and the like. It can be used literally as a handy portable telephone. The PHS greatly differs from the existing cellular type system in that the PHS employs the small zone system.

Conventionally, a system of identifying the position of a mobile terminal is proposed according to the received electric field intensity of the radio wave of the repeater in the neighborhood of the mobile terminal that is transmitted therefrom and the identification code of the repeater, taking advantage of the feature that the radio zone of the PHS is of a small area.

However, there is a limit in the accuracy of identifying the position of the mobile terminal according to the repeater present in a radio zone how small the area may be. In order to improve the accuracy of identifying the position, the radio zone must be made smaller and the number of repeaters increased. However, this causes a great economical burden since the line facility and the like will be required for the repeaters to allow transmission/reception of information with the control station. Furthermore, if the number of repeaters is increased, the load on the control station to coordinate the repeaters becomes heavier to cause the possibility of disabled control.

In the case of a location system that uses the portable terminal of the PHS employed as a private extension within a building or the like, a possible consideration is to install many private repeaters in the building to improve the accuracy of identifying the position. However, a PBX of a great line capacity will be required as the number of repeaters is increased. There is also the problem that the economical burden is great. Furthermore, the installation cost to connect the line of each repeater to the PBX will be required. Thus, the economical burden will become greater in proportion to the increase in the number of repeaters.

SUMMARY OF THE INVENTION

In view of the foregoing, an object of the present invention is to improve the accuracy of identifying the position of a mobile terminal with the minimum cost.

According to an aspect of the present invention, a location system for identifying the position of a mobile terminal that can communicate based on a repeater installed in a radio zone, includes: a plurality of transmitter units installed around the mobile terminal apart from the repeater to send transmitter unit identification information that allows identification of each transmitter unit to the mobile terminal by a wave of a predetermined transmission output; a received field intensity measurement unit that can measure the received field intensity at the mobile terminal from the plurality of transmitter units for every different transmitter unit; and a position identify unit identifying the position of the mobile terminal according to the measured result of the received field intensity measurement unit.

According to another aspect of the present invention, a location method for identifying the position of a mobile terminal that can communicate based on a repeater provided in a radio zone, includes the steps of: sending from a plurality of transmitter units installed around the mobile terminal apart from the repeater transmitter unit identification information that can identify each of the plurality of transmitter units to the mobile terminal by a wave of a predetermined transmission output; measuring the received field intensity at the mobile terminal from the plurality of transmitter units for every different transmitter unit; and identifying the position of the mobile terminal according to the measured received field intensity.

According to a further aspect of the present invention, a mobile terminal that can communicate based on a repeater provided in a radio zone, includes: a received field intensity measurement unit measuring the received field intensity of a wave sent from a plurality of transmitter units installed around the mobile terminal apart from the repeater for every different transmitter unit; and a memory unit for storing the measured result of the received field intensity measurement unit.

Thus, the main advantage of the present invention is that a great number of repeaters to improve the accuracy for identifying the position of a mobile terminal does not have to be installed, and that the accuracy of identifying the location can be improved with the minimum cost by taking advantage of the received field intensity of the plurality of transmitter units installed around the mobile terminal apart from the repeater.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Preferable embodiments of the present invention will be described in detail hereinafter with reference to the drawings.

Figure 1:
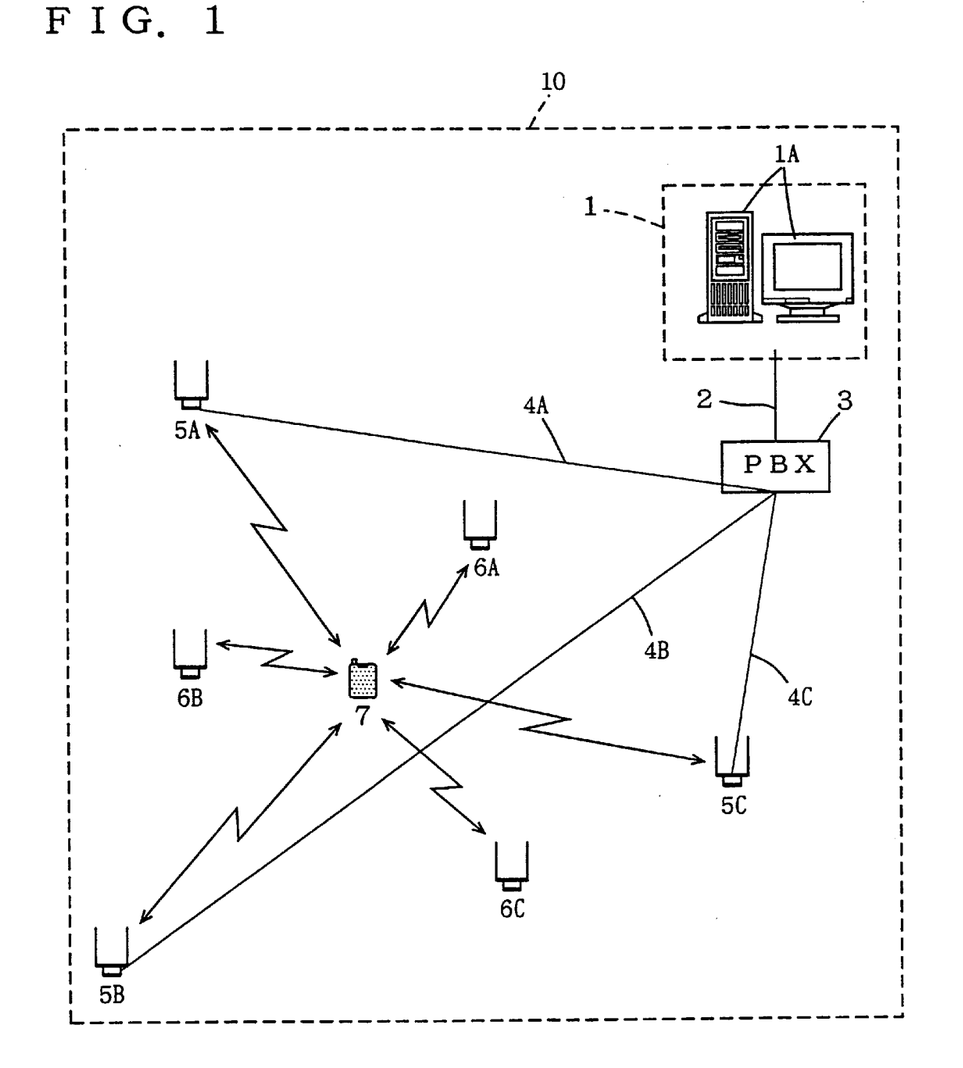
FIG. 1 is a schematic diagram showing an entire structure of the present system.

Referring to FIG. 1, a mobile terminal 7 is, for example, a PHS terminal that is carried by an employee that works at the building premises 10. Mobile terminal 7 has its physical location altered within the building by being carried by the employee.

A private PHS network is installed in premises 10 that allows usage of mobile terminal 7 as an extension 2. PBX 3 is connected to a private repeater 5 (5A, 5B, 5C . . . ) by communication lines 4A, 4B, 4C . . . that are arranged indoor of the building of premises 10. PBX 3 functions as the control station that coordinates the communication through the extension of mobile terminal 7 via repeaters 5A, 5B, 5C . . . .

At respective sites on premises 10, an ID transmitter 6 (6A, 6B, 6C . . . ) transmitting an ID (identification information) representative thereof is provided independent of the private network including repeaters 5A, 5B, 5C . . . .

A center station 1 functions to identify the position of mobile terminal 7. A personal computer 1A used for locating is installed at center station 1. The position information corresponding to the position where ID transmitter 6 is installed is prestored in personal computer 1A on an ID-by-ID basis. Personal computer 1A is connected to PBX 3 through the extension. The received field intensity information output from mobile terminal 7 is applied to personal computer 1A via any of the plurality of repeaters 5A, 5B, 5C . . . .

The method of identifying the position of mobile terminal 7 will be described specifically hereinafter. Mobile terminal 7 identifies each repeater 5 by the repeater identification code transmitted from repeaters 5A, 5B, 5C . . . , and constantly monitors the received field intensity of the wave output from each repeater 5. A repeater 5 is selected according to the level of the received field intensity to register the call area at PBX 3. By such a procedure, a link channel is established between mobile terminal 7 and control station 3. When there is a communication to or from mobile terminal 7, control is effected to connect the call. As a result, conversation or communication is allowed.

Mobile terminal 7 selects an appropriate repeater 5 while measuring the received field intensity of each of ID transmitters 6A, 6B, 6C . . . . Each detected received field intensity is stored internally classified by the ID issued from each of ID transmitters 6A, 6B, 6C . . . . Mobile terminal 7 also measures the received electric field intensity of repeaters 5A, 5B, 5C . . . , and stores internally the detected received field intensity classified by the identification code issued from each of repeaters 5A, 5B, 5C . . . . The received field intensity of ID transmitter 6 and repeater 5 stored in mobile terminal 7 is altered in accordance with the shift, if any, of mobile terminal 7 within premises 10.

The staff of center station 1 operates personal computer 1A to send a call to mobile terminal 7. Under control of PBX 3, connection is established between personal computer 1A and mobile terminal 7. The present embodiment may be implemented so that a call is automatically sent to mobile terminal 7 at a constant time interval without the operation of the staff of center station 1. Mobile terminal 7 transmits the received field intensity information of each of ID transmitters 6A, 6B, 6C . . . and each of repeaters 5A, 5B, 5C . . . stored internally in response to a request from personal computer 1A. The transmitted received field intensity information is input to personal computer 1A via repeater 5 located at the registered call area.

Position information indicating the location of each of ID transmitters 6A, 6B, 6C . . . is stored in personal computer 1A, classified by the ID of ID transmitter 6. The position information indicating the location of each of repeaters 5A, 5B, 5C . . . is also stored in personal computer 1A, classified by the identification code of repeater 5. Personal computer 1A identifies the position of mobile terminal 7 from the input received field intensity information and the internally-stored position information. For example, personal computer 1A identifies the possible location range of mobile terminal 7 from the received field intensity of each of ID transmitters 6A, 6B, 6C . . . and each of repeaters 5A, 5B, 5C . . . , and then determines the position of mobile terminal 7 by computing the overlapping area of each identified range. The identified result of the location of mobile terminal 7 is displayed, for example, on a monitor screen connected to personal computer 1A. Thus, the position of mobile terminal 7 is indicated to the staff of center station 1.

Figure 2:
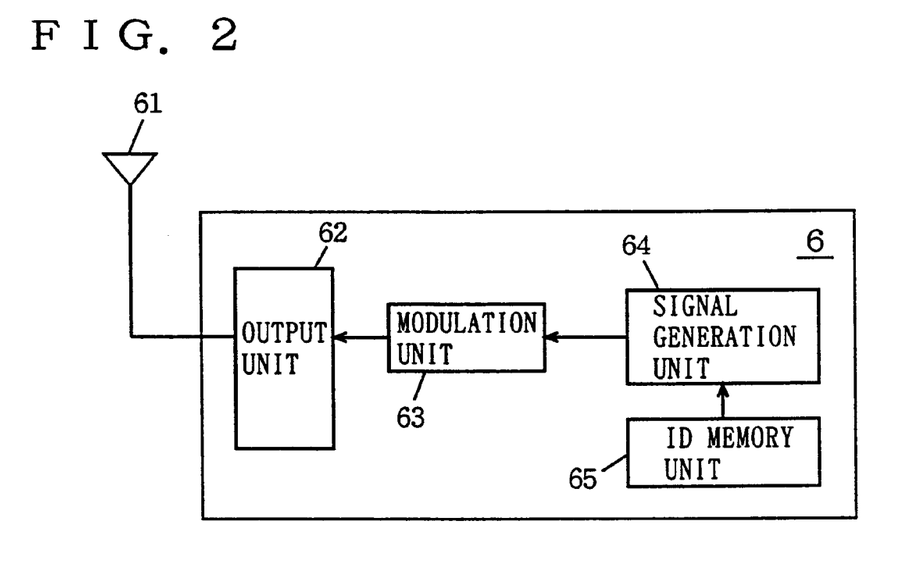
FIG. 2 is a block diagram showing a structure of an ID transmitter 6.

FIG. 2 is a block diagram showing a structure of ID transmitter 6. ID transmitter 6 includes an ID memory unit 65 for storing a predetermined ID, a signal generation unit 64 generating an ID signal according to the ID stored in ID memory unit 65, a modulation unit 63 modulating the ID signal generated by signal generation unit 64, an output unit 62 for providing the ID signal modulated by modulation unit 63, and an antenna unit 61. Although not shown, ID transmitter 6 has the function to appropriately arrange the wave among repeaters 5 and among ID transmitters 6. This is required to establish synchronization with the timing of repeater 5. Control is provided so as to allocate the slot of the control channel with the timing of repeaters 5 deviated from each other in a self-isolating manner.

Signal generation unit 64 continuously generates an ID signal. Therefore, an ID is continuously emitted from antenna unit 61 by a wave of a predetermined frequency and a predetermined transmission output corresponding to the private usage.

As depicted, ID transmitter 6 does not have the feature to receive information from mobile terminal 7 and the like. ID transmitter 6 only has the transmitting feature of sending the internally stored ID towards mobile terminal 7. Therefore, ID transmitter 6 can be made more compact and lighter than repeater 5 that is relatively small in size and weight (for example, capacity: 3–10 litters; weight: 3–10 kg). This means that the trouble of installing the facility is not required in this case where the position of mobile terminal 7 is to be identified taking advantage of the received electric field intensity of ID transmitter 6 than of repeater 5. Also, extra area to install the facility will not be required. Furthermore, a line connection unit to connect the wires of communication lines 4A, 4B, 4C . . . as for repeater 5 is not required since ID transmitter 6 is absent of the feature of relaying information of mobile terminal 7 as repeater 5.

By virtue of ID transmitter 6 structured as described above, the cost of the facility and installation to improve the accuracy of the location can be suppressed by installing many more ID transmitters 6 than in the case of installing more repeaters 5. Furthermore, since the connection of ID transmitter 6 with PBX 3 is dispensable contrary to repeater 5, it is not necessary to increase the extension connection package of the PBX 3 end or replace PBX 3 itself with another type of higher line capacity. By employing ID transmitter 6 affirmatively for position identification, the accuracy of the location can be improved with the cost as low as possible.

Figure 3:
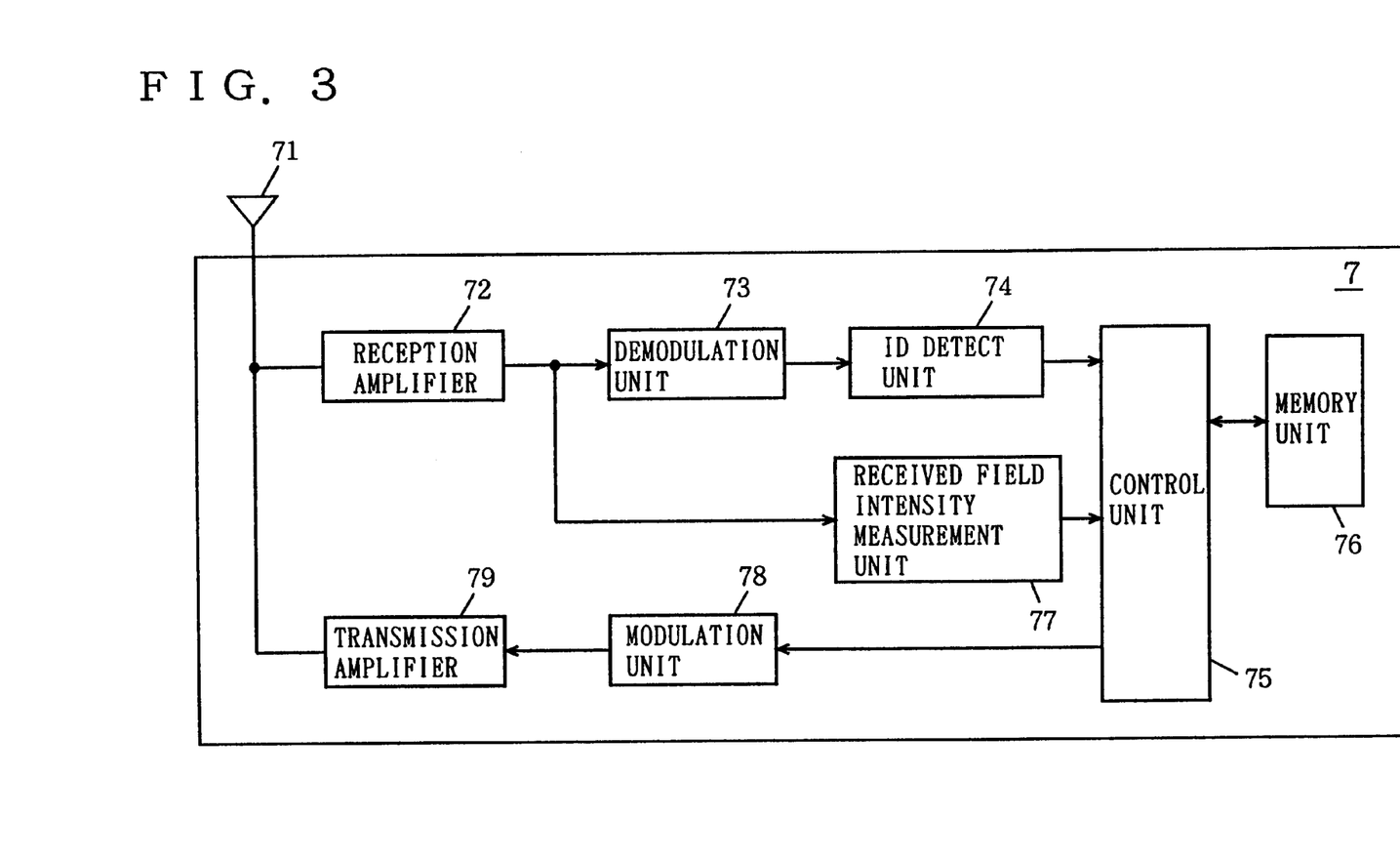
FIG. 3 is a block diagram showing a structure of a mobile terminal 7.

FIG. 3 is a block diagram showing a structure of mobile terminal 7. Mobile terminal 7 includes an antenna unit 71, a reception amplifier 72, a demodulation unit 73, an ID detect unit 74, a control unit 75, a memory unit 76, a received field intensity measurement unit 77, a modulation unit 78, and a transmission amplifier 79.

The wave issued from ID transmitter 6 is received by antenna unit 71. This wave is amplified by reception amplifier 72 and converted into an intermediate frequency to be output to demodulation 73 and received field intensity measurement unit 77.

Received field intensity measurement unit 77 measures the received field intensity of each ID transmitter 6 according to the output of reception amplifier 72. The result of the measured received field intensity is output to control unit 75. Demodulation unit 73 demodulates the output signal of reception amplifier 72. The demodulated signal is applied to ID detect unit 74. ID detect unit 74 detects the ID of ID transmitter 6 from the demodulated signal. The detected result is supplied to control unit 75.

Control unit 75 sequentially stores into memory unit 76 the ID output from ID detect unit 74 and the information of the received field intensity output from received field intensity measurement unit 77 as a pair of received field intensity information.

The wave issued from each repeater 5 is received on antenna unit 71. Upon reception of the wave from repeater 5, the wave is amplified by reception amplifier 72 to be provided to demodulation unit 73 and received field intensity measurement unit 77. Received field intensity measurement unit 77 measures the received field intensity of each repeater 5 according to that output. The measured result is applied to control unit 75. Demodulation unit 73 demodulates the signal output from reception amplifier 72. The demodulated signal is applied to ID detect unit 74. ID detect unit 74 detects the identification code of repeater 5 according to the signal output from demodulation unit 73. The detected result is applied to control unit 75. Control unit 75 sequentially stores into memory unit 76 the identification code output from ID detect unit 74 and the received field intensity output from received field intensity measurement unit 77 as one pair of received field intensity information. Control unit 75 selects an appropriate repeater 5 to be used for communication according to the received field intensity information stored in memory unit 76. Then, control unit 75 provides to modulation unit 78 the signal to register the selected repeater 5 to PBX 3 (refer to FIG. 1). The signal provided to modulation unit 78 is modulated into a predetermined high frequency signal. Then, the signal is amplified by transmission amplifier 79 to be output from antenna unit 71.

Communication between personal computer 1A and mobile terminal 7 is enabled by calling mobile terminal 7 from personal computer 1A (refer to FIG. 1) installed at a remote site. Control unit 75 responds to a transmission request of personal computer 1A to provide to modulation unit 78 the received field intensity information (the information pair of the ID and received field intensity of each ID transmitter 6, and the information pair of the identification code and received field intensity of each repeater 5) stored in memory unit 76. Accordingly, the received field intensity information is applied to the preselected repeater 5 via modulation unit 78, transmission amplifier 79, and antenna unit 71. The information applied to repeater 5 is input to personal computer 1A via PBX 3. At personal computer 1A, the position of mobile terminal 7 is identified according to the input received field intensity information.

Figure 4:
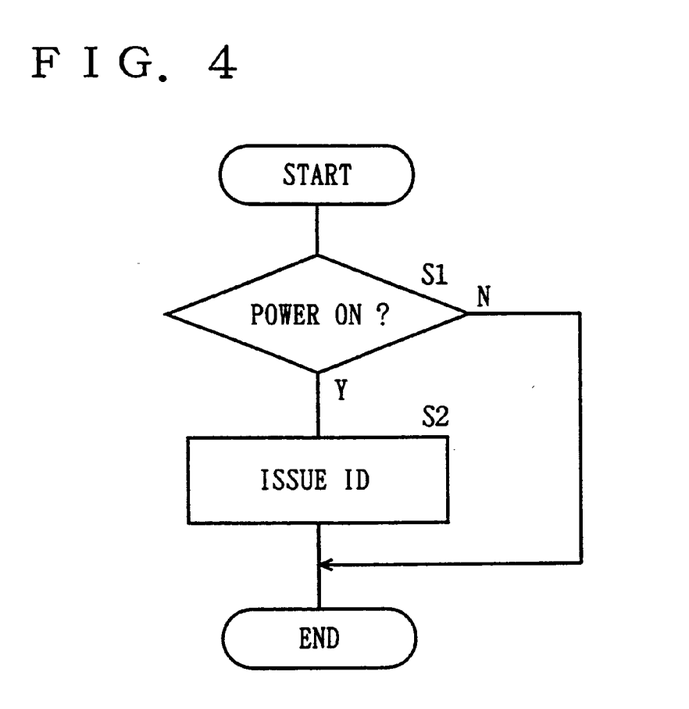
FIG. 4 is a flow chart showing the process of ID transmitter 6.

FIG. 4 is a flow chart showing the process of ID transmitter 6. Under the condition of the power being turned on (S1), ID transmitter 6 issues the ID stored in ID memory unit 65 (S2). ID transmitter 6 carries out this process repeatedly. Thus, an ID is continuously emitted from ID transmitter 6.

Figure 5:
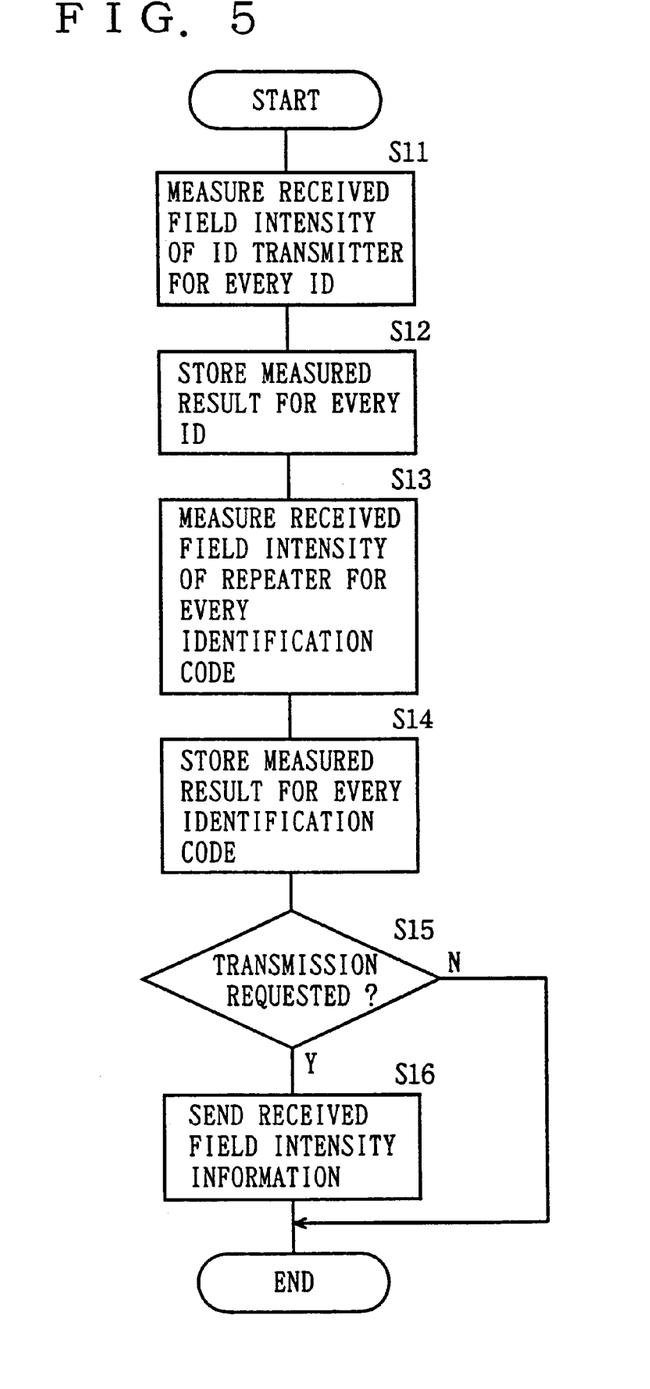
FIG. 5 is a flow chart showing the process of mobile terminal 7.

FIG. 5 is a flow chart showing the process of mobile terminal 7. Mobile terminal 7 executes the process set forth in the following repeatedly for every predetermined time. The control program required to execute the following process is stored in control unit 75.

First, mobile terminal 7 measures the received field intensity of each ID transmitter 6 on an ID-by-ID basis (S11). The measured result of the received field intensity of each ID transmitter 6 is stored in memory unit 76, classified by the ID (S12). Then, the received field intensity of each repeater 5 is measured on for every different identification code (S13). The measured result of the received field intensity of each repeater 5 is stored in memory 76, classified by the identification code (S14).

Then, determination is made whether there is a transmission request from personal computer 1A (S15). The process ends when determination is made that there is no transmission request from personal computer 1A. In the case where the process ends because there is no transmission request from personal computer 1A, the process from S11 is carried out repeatedly.

In the case where determination is made that there is a transmission request from personal computer 1A at S15, the received field intensity information of ID transmitter 6 and repeater 5 stored in memory unit 76 is transmitted to personal computer 1A (S16). Then, the process ends. Next, the process from S11 is carried out again repeatedly.

Figure 6:
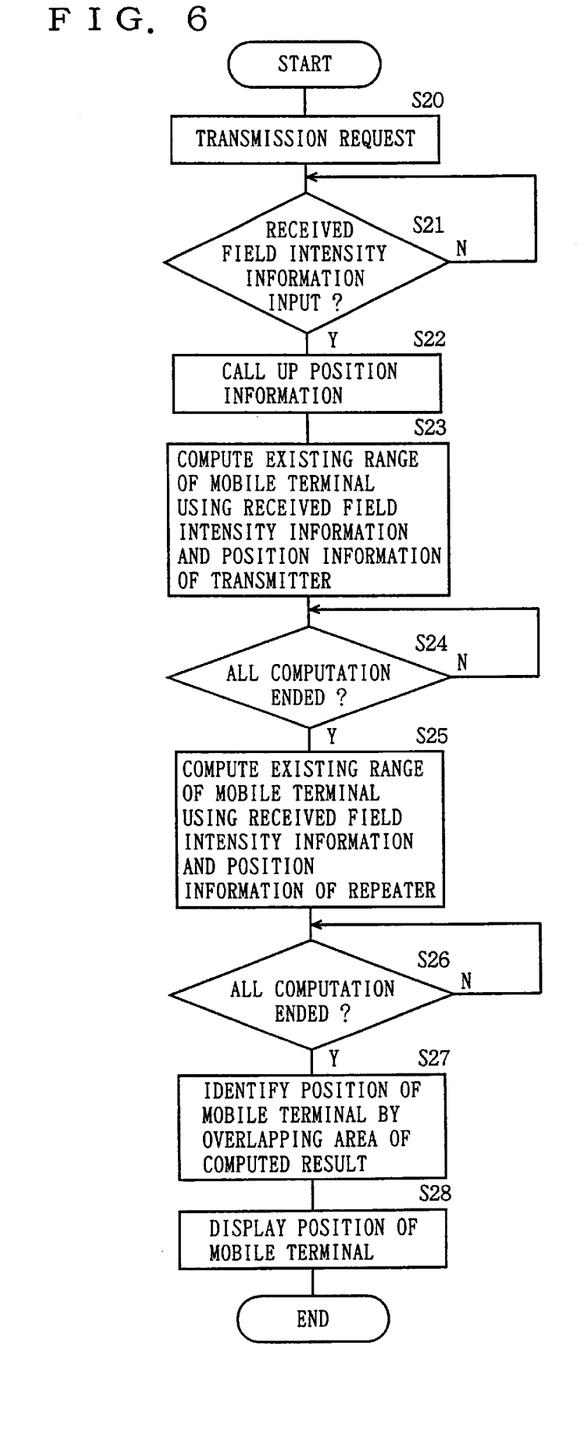
FIG. 6 is a flow chart showing the process of a personal computer 1A.

FIG. 6 is a flow chart showing the process of personal computer 1A. The control program required to execute the process set forth in the following is stored in a ROM (Read Only Memory) not shown in personal computer 1A.

Personal computer 1A is manipulated by the operator to request transmission of received field intensity information to mobile terminal 7 (S20). Determination is made whether received field intensity information is input from mobile terminal 7 (S21). Waiting is conducted until the received field intensity information is input.

Upon input of received field intensity information from mobile terminal 7, the position information of repeater 5 and the position information of ID transmitter 6 stored in personal computer 1A is called up (S22). Then, the range where mobile terminal 7 can be present is computed according to the received field intensity information of transmitter 6 among the input received field intensity information and the position information of transmitter 6 out of the retrieved position information (S23). This process is carried out for all the received field intensity information corresponding to ID transmitter 6. When the process of S23 ends for all the received field intensity information corresponding to ID transmitter 6, determination of YES is made at S24. Then, the range where mobile terminal 7 can be present is computed according to the position information of repeater 5 and the received field intensity information corresponding to repeater 5 (S25). This process is carried out for all the received field intensity information corresponding to repeater 5. When the process of S25 ends for all the received field intensity information corresponding to repeater 5, determination of YES is made at S26.

Then, the overlapping area of the computed result of S23 and computed result of S25 is obtained. The position of mobile terminal 7 is identified by this computed result (S27). More specifically, the overlapping area out from the computed range of mobile terminal 7 at S23 and S25 is identified as the location of mobile terminal 7.

Then, the identified position of mobile terminal 7 is displayed on the monitor of personal computer 1A (S28).

Figure 7:
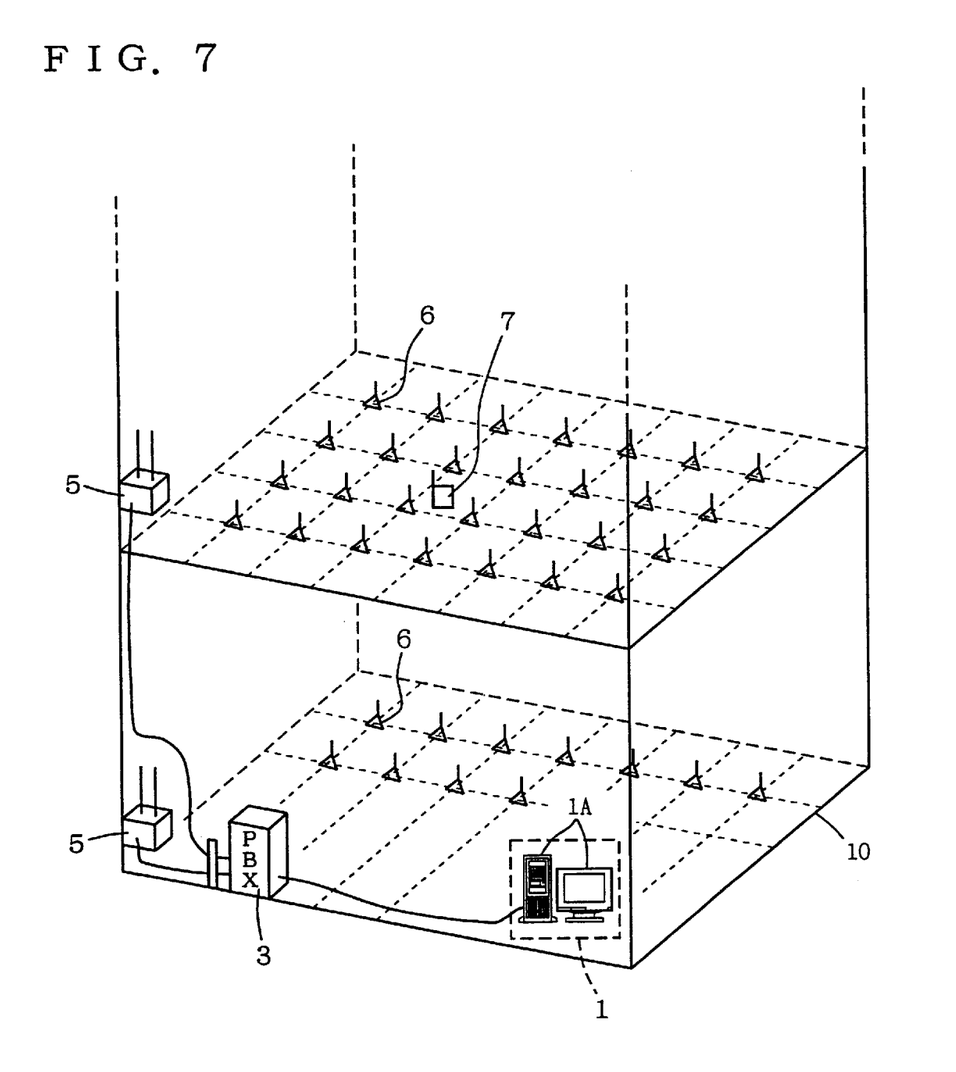
FIG. 7 shows a structure of an ID transmitter 6, a mobile terminal 7, and a repeater 4 in the building premises 10.

FIG. 7 shows a structure of ID transmitter 6, mobile terminal 7, and repeater 4 provided in building premises 10. Premises 10 is, for example, a building of a plurality of stories. ID transmitter 6 is arranged on each floor in a lattice manner. The main body of ID transmitter 6 is embedded inside the floor so as to avoid being an obstacle in passage.

A private repeater 5 for radio communication with mobile terminal 7 is installed at a predetermined site on each floor. Repeater 5 is connected through a private line to PBX 3 located at the basement of the building. Personal computer 1A of center station 1 is connected to the extension channel of PBX 3. Personal computer 1A is configured to identify the position of mobile terminal 7 that is moved throughout the building.

According to the illustrated structure, the position of mobile terminal 7 during movement in a building of a plurality of stories can be supervised at one place in a centralized manner. This structure can be utilized in the case where, for example, the foreman of a working party in a construction work wants to acknowledge the location of each worker in a centralized manner by having each worker carry a mobile terminal (PHS terminal) 7 within the premises 10 of the construction work. Alternatively, the structure can be utilized in the case where mobile terminal (PHS terminal) 7 is attached to the luggage of a passenger at the premises of an airport to coordinate the luggage.

Figure 8:
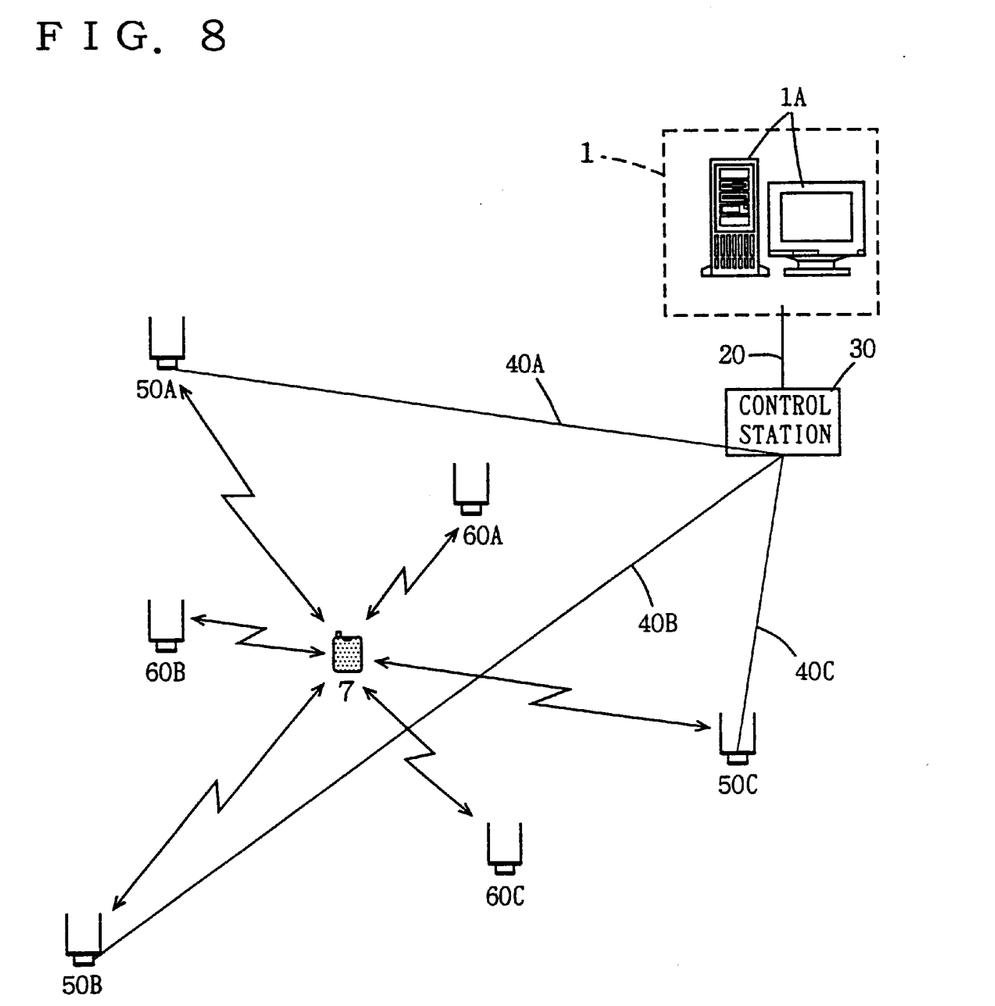
FIG. 8 shows the structure of the entire system to describe another embodiment of the present invention.

FIG. 8 shows a structure of the entire system for describing another embodiment of the present invention. In contrast to the embodiment of the FIG. 1 that uses a private PHS network, the present embodiment of FIG. 8 corresponds to the case where the public PHS network is applied.

Mobile terminal 7 is located at a radio zone (simultaneous calling area) of any of repeater 50 (50A, 50B, 50C . . . ) that constitutes the public PHS network. The person carrying mobile terminal 7 can communicate through voice and the like using the PHS. Repeater 50 is connected to a control station 30 that controls repeater 50 via a communication line 40 (40A, 40B, 40C . . . ) of the ISDN. Also, a central station 1 is provided remote from mobile terminal 7. Personal computer 1A of central station 1 is connected to control station 30 via a public line 20.

Mobile terminal 7 measures the received field intensity of each of repeaters 50A, 50B, 50C . . . and each of ID transmitters 60A, 60B, 60C . . . . The measured intensity is stored internally, classified by the identification code of each repeater 50 and by the ID of each ID transmitter 60.

By transmission of the public line number of mobile terminal 7 from personal computer 1A subsequent to the specification of an appropriate repeater 50 as the call area according to the measured result of the received field intensity from mobile terminal 7, connection between mobile terminal 7 and personal computer 1A is established by control station 30. At the stage where communication with personal computer 1A is enabled, mobile terminal 7 sends the received field intensity information of each repeater 50 and each ID transmitter 60 to the preselected repeater 50. Accordingly, the received field intensity information is applied to personal computer 1A via, for example, the communication channel. Personal computer 1A identifies the position of mobile terminal 7 according to the received field intensity information.

Although the transmission of the received field intensity information employs the communication channel (traffic channel) in the present embodiment, a control channel may be used instead. Accordingly, the communication cost can be reduced than the case where the traffic channel is used.

Modifications of the above-described embodiment are set forth in the following.

(1) As a specific example of ID transmitter 6, the general PHS cordless base unit that is popular domestically can be considered. The PHS cordless base unit allows the PHS terminal to be used as a remote unit of the telephone set connected to the general subscriber telephone line. By registering the PHS terminal and the telephone set to this PHS cordless base unit, a call to the telephone set via the general subscriber telephone line is transferred by the relay feature of the PHS cordless base unit to the preregistered PHS terminal.

By using such an existing PHS cordless base unit, the cost and trouble to prepare and install a dedicated ID transmitter 6 can be eliminated. Particularly, it is noted that the cost of a private repeater 5 is approximately a hundred and several ten thousand Japanese yen whereas the actual price of a PHS cordless base unit is less than ten thousand yen. By using the PHS cordless base unit functioning as an ID transmitter together with repeater 5 for the purpose of identifying the position of mobile terminal 7, the accuracy of location can be improved more economically.

It is to be noted that the PHS cordless base unit utilizes a frequency range identical to that of private repeater 5 arranged in the private PHS network In an area where both the private repeater 5 and the PHS cordless base unit are installed, the received field intensity of both the private repeater 5 and the PHS cordless base unit can be obtained together by measuring the received field intensity of the wave of one frequency range.

(2) In the present embodiment, the received field intensity information from mobile terminal 7 is sent to personal computer 1A in response to an instruction from personal computer 1A. A structure can be implemented in which the receive field intensity information is transmitted periodically from the end of mobile terminal 7.

(3) In the present embodiment, the position of mobile terminal 7 is identified by using together the received field intensity of repeater 5 and the received field intensity of ID transmitter 6. A structure may be implemented in which the received field intensity of repeater 5 is not used for locating, and the position of mobile terminal 7 is identified according to solely the received field intensity of ID transmitter 6. By increasing the number of ID transmitters 6 installed, mobile terminal 7 can be located at a level of accuracy high enough without using the received field intensity of repeater 5.

(4) Mobile terminal 7 can be configured to include position information, and carry out the computation for position identification. The result of the identified position (for example, coordinates and the like) can be sent to personal computer 1A.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A location system for identifying the position of a mobile terminal that can communicate based on a plurality of repeaters provided at a plurality of radio zones that forms a communication network, comprising:

a plurality of transmitters installed around said mobile terminal configured for sending transmitter identification information that allows identification of each transmitter to said mobile terminal by a wave of a predetermined transmission output, wherein said plurality of transmitters is not connected to said communication network;

a received field intensity measurement unit configured to measure received field intensity of signals from said plurality of transmitters at said mobile terminal and to measure received field intensity of signals from said plurality of repeaters at said mobile terminal; and a position identify unit configured for identifying the position of said mobile terminal according to a measured result of received field intensity of said signals from said plurality of transmitters and a measured result of received field intensity of said signals from said plurality of repeaters.

2. The location system according to claim 1, further comprising transmission apparatus configured for sending a measured result of said received field intensity measurement unit to said position identification unit.

3. The location system according to claim 1, wherein said repeater is a repeater in a personal handyphone system.

4. A location method for identifying the position of a mobile terminal that can communicate based on a plurality of repeaters provided in a plurality of radio zones that forms a communication network, comprising:

sending from a plurality of transmitters installed around said mobile terminal transmitter identification information that allows identification of each transmitter to said mobile terminal by a wave of a predetermined transmission output, wherein said plurality of transmitters is not connected to said communication network;

measuring received field intensity of signals from said plurality of transmitters at said mobile terminal;

measuring received field intensity of signals from said plurality of repeaters at said mobile terminal; and identifying the position of said mobile terminal according to a measured result of received field intensity of said signals from said plurality of transmitters and a measured result of received field intensity of said signals from said plurality of repeaters.

5. A mobile terminal that is configured to communicate based on a plurality of repeaters provided in a plurality of radio zones that forms a communication network, comprising:

a received field intensity measurement unit configured for measuring received field intensity of signals from said plurality of repeaters and signals from a plurality of transmitters installed around said mobile terminal, wherein said plurality of transmitters is not connected to said communication network;

a memory arranged for storing a measured result of said received field intensity measurement unit; and a transmission apparatus configured to send a measured result of received field intensity of said signals from said plurality of transmitters and a measured result of received field intensity of said signals from said plurality of repeaters to one of said plurality of repeaters.

6. The mobile terminal according to claim 5, wherein said mobile terminal is a terminal used in a personal handyphone system.

* * * * *